United States Patent
Fleischmann et al.

(10) Patent No.: US 11,543,015 B2
(45) Date of Patent: Jan. 3, 2023

(54) METHOD FOR SUPPRESSING NOISES IN A DUAL CLUTCH TRANSMISSION FOR A MOTOR VEHICLE, AND DUAL CLUTCH TRANSMISSION FOR A MOTOR VEHICLE

(71) Applicant: AUDI AG, Ingolstadt (DE)

(72) Inventors: Hans-Peter Fleischmann, Stammham (DE); Lutz Gundlach, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 103 days.

(21) Appl. No.: 16/972,227

(22) PCT Filed: Jun. 6, 2019

(86) PCT No.: PCT/EP2019/064843
§ 371 (c)(1),
(2) Date: Dec. 4, 2020

(87) PCT Pub. No.: WO2020/020527
PCT Pub. Date: Jan. 30, 2020

(65) Prior Publication Data
US 2021/0231209 A1 Jul. 29, 2021

(30) Foreign Application Priority Data
Jul. 27, 2018 (DE) ...................... 10 2018 212 595.3

(51) Int. Cl.
*F16H 57/00* (2012.01)
*F16H 3/00* (2006.01)
(Continued)

(52) U.S. Cl.
CPC ......... *F16H 57/0006* (2013.01); *F16H 3/006* (2013.01); *F16H 3/0915* (2013.01); *F16H 61/688* (2013.01); *F16H 2306/40* (2013.01)

(58) Field of Classification Search
CPC .... F16H 57/0006; F16H 3/006; F16H 61/688; F16H 2306/40
(Continued)

(56) References Cited

U.S. PATENT DOCUMENTS 10,005,467 B2 * 6/2018 Schwalm ............ F16H 57/0006
10,196,060 B2 * 2/2019 Karpenman ........ F16H 61/0403
(Continued)

FOREIGN PATENT DOCUMENTS

DE       102 44 026 A1    4/2004
DE   10 2009 014 705 B4    5/2011
(Continued)

OTHER PUBLICATIONS

Notification of Transmittal of Translation of the International Preliminary Report on Patentability dated Feb. 11, 2021 in corresponding International Application No. PCT/EP2019/064843; 11 pages.
(Continued)

*Primary Examiner* — Ha Dinh Ho
(74) *Attorney, Agent, or Firm* — Maier & Maier, PLLC

(57) ABSTRACT

A method for suppressing noises in a dual clutch transmission, which has two partial transmissions and each partial transmission has at least two synchronizers, for a motor vehicle. A respective shaft of the respective partial transmission is to be synchronized by the respective synchronizer with a respective idler, which is arranged on the respective shaft and is associated with the respective synchronizer, of the respective partial transmission. To suppress noises, one of the synchronizers of one of the partial transmissions is actuated, while the one partial transmission is activated, the other partial transmission is deactivated, and the idler which is associated with the other synchronizer of the one partial transmission is connected in a rotationally-fixed manner to the shaft of the one partial transmission.

13 Claims, 1 Drawing Sheet

(51) Int. Cl.
*F16H 61/688* (2006.01)
*F16H 3/091* (2006.01)

(58) Field of Classification Search
USPC .................................................. 74/330, 335
See application file for complete search history.

(56) References Cited

U.S. PATENT DOCUMENTS

| | | | |
|---|---|---|---|
| 10,247,249 B2* | 4/2019 | Vogel | ...................... F16D 13/70 |
| 2018/0057010 A1* | 3/2018 | Schwalm | ............ F16H 57/0006 |

FOREIGN PATENT DOCUMENTS

| | | |
|---|---|---|
| DE | 10 2012 221 483 A1 | 6/2013 |
| DE | 10 2008 032 757 B4 | 3/2016 |

OTHER PUBLICATIONS

Examination Report dated Mar. 8, 2019 in corresponding German application No. 10 2018 212 595.3; 10 pages including Machine-generated English-language translation.

International Search Report dated Oct. 10, 2019 in corresponding International application No. PCT/EP2019/064843; 6 pages.

Written Opinion of the International Searching Authority dated Oct. 10, 2019 in corresponding International application No. PCT/EP2019/064843; 16 pages including Machine-generated English-language translation.

Heumesser et al., "Rattle noises of dual clutch transmissions", Forschung Im Ingenieurwesen Engineering Research, 2018, pp. 187-195 ; 18 pages including Machine-generated English-language translation.

* cited by examiner

METHOD FOR SUPPRESSING NOISES IN A DUAL CLUTCH TRANSMISSION FOR A MOTOR VEHICLE, AND DUAL CLUTCH TRANSMISSION FOR A MOTOR VEHICLE

FIELD

The disclosure relates to a method for suppressing noises in a dual clutch transmission for a motor vehicle, in particular for an automobile. In addition, the disclosure relates to a dual clutch transmission for motor vehicle.

BACKGROUND

DE 102 44 026 A1 discloses a method for reducing oscillations in a motor vehicle, in which the disturbing oscillations are established by a control and regulating device by means of suitable sensors and if previously defined limiting values are exceeded, at least one device is actuated by the control and regulating device in such a way that the disturbing oscillation is completely remedied or at least damped in its amplitude. It is provided here that the at least one device acts on at least one rotating component in the vehicle drivetrain in such a way that the latter is decelerated continuously or periodically in its rotational movement upon the occurrence of the oscillations or is excited into a compensation oscillation.

A dual clutch transmission is known from DE 10 2009 014 705 B4 having a first input shaft and a second input shaft and having at least one driven shaft, which is connected to the input shafts via wheel sets.

Furthermore, DE 10 2012 221 483 A1 discloses a dual clutch transmission in a motor vehicle having two partial transmissions each having a transmission input shaft, which can each be coupled by means of a friction clutch to a driveshaft of a drive unit.

In addition, a method for suppressing transmission noises in a dual clutch transmission for a motor vehicle can be inferred as known from DE 10 2008 032 757 B4.

SUMMARY

The object of the present invention is to provide a method and a dual clutch transmission so that particularly advantageous noise behavior may be implemented in a particularly simple and cost-effective way.

A first aspect of the invention relates to a method for suppressing noises in a dual clutch transmission, which has two partial transmissions and each partial transmission has at least two synchronizers, for a motor vehicle, in particular for an automobile and preferably for a passenger vehicle. In other words, the dual clutch transmissions has at least or precisely two partial transmissions. The respective partial transmission has at least two synchronizers. By means of the respective synchronizer, a respective shaft of the respective partial transmission is to be synchronized with a respective idler of the respective partial transmission arranged on the respective shaft and associated with the respective synchronizer. This means that the respective partial transmission has at least one shaft, wherein the respective synchronizer of the respective partial transmission is associated with at least or precisely one idler. The respective partial transmission therefore also comprises the idlers of the respective partial transmission. The respective idler is preferably a gearwheel which is arranged rotatably on the respective shaft of the respective partial transmission, so that the respective idler can be rotated relative to the respective shaft of the respective partial transmission when the respective idler is not connected in a rotationally-fixed manner to the respective shaft of the respective partial transmission. Since, for example, initially the respective idler is not connected in a rotationally-fixed manner to the respective shaft of the respective partial transmission, different speeds of the respective idler and the respective shaft of the respective partial transmission and thus a speed difference between the respective idler and the respective shaft of the respective partial transmission can occur.

The speed difference is to be understood to mean that the respective shaft rotates in relation to the respective idler of the respective partial transmission. The respective synchronizer, which is associated with the respective idler, can be used or is used to at least reduce and preferably to cancel the above-described speed difference between the shaft and the idler associated with the respective synchronizer. As a result of the reduction or cancellation of the speed difference between the respective shaft and the respective idler, the respective idler can be connected in a rotationally-fixed manner, in particular a formfitting rotationally-fixed manner, to the respective shaft, without excessive loads of the dual clutch transmission occurring. The reduction or cancellation of the speed difference, which is also referred to as the speed disparity, is also referred to as synchronizing or synchronization, wherein respective speeds of the respective idler and the respective shaft are equalized to one another in the context of the synchronization.

In the context of the synchronization, for example, the respective idler and the respective shaft are at least or exclusively frictionally coupled, i.e. by friction, via the synchronizer which is associated with the idler. The synchronizer can be designed here as a conventional synchronizer, as is well known from the general prior art, in particular from automotive engineering. In particular, the synchronizer can be designed as blocking synchronization and/or can have at least two friction partners. One of the friction partners is, for example a synchronizer ring, wherein the other friction partner is, for example a clutch body. The clutch body is, for example, connected in a rotationally-fixed manner to the idler, which is associated with the synchronizer. The synchronizer ring is, for example, displaceable in the axial direction of the idler in relation thereto and in relation to the clutch body and, for example, is co-rotatable with a sliding collar also referred to as a shifting collar, which is in turn co-rotatable with the respective shaft. The sliding collar can also be a component of the synchronizer here.

To be able to suppress noises in the dual clutch transmission in a particularly simple and cost-effective manner, so that a particularly advantageous noise behavior of the dual clutch transmission and thus of the motor vehicle as a whole may be implemented in a particularly simple and cost-effective manner, it is provided according to the invention that to suppress noises of the dual clutch transmission, one of the synchronizers of one of the partial transmission is actuated, in particular actively or deliberately, while the one partial transmission is activated or active, the other partial transmission is deactivated or passive, and the idler which is associated with the corresponding other synchronizer of the one partial transmission is connected in a rotationally-fixed manner to the shaft of the one partial transmission.

The feature that the one partial transmission is activated or active is to be understood to mean that at least one torque, in particular from a drive motor, is transmittable or is transmitted to an output shaft via the activated one partial transmission. The torque is provided, for example, by the drive engine, wherein the drive motor can be designed, for example, as an internal combustion engine or as an electric motor. This means, for example, that a torque flow, via which the torque, which is provided in particular by the drive motor, is transmittable or is transmitted from the drive motor to the output shaft, is closed by the one activated partial transmission or extends via the one partial transmission.

In other words, the one partial transmission is arranged in the torque flow downstream of the drive motor and upstream of the output shaft. Expressed in still other words, for example, a first transmission path is provided, via which the torque provided by the drive motor can be transmitted from the drive motor via the one partial transmission to the output shaft. In this case, in the scope of the method according to the invention, the first transmission path is closed, so that the torque provided by the drive motor is transmitted from the drive motor to the one activated partial transmission and from the one activated partial transmission to the output shaft. The torque is thus transmitted from the drive motor via the one activated partial transmission to the output shaft. For this purpose, the idler which is associated with the other synchronizer of the one partial transmission is connected in a rotationally-fixed manner to the shaft of the one partial transmission, whereby, for example, a gear comprising the idler, which is associated with the other synchronizer of the one partial transmission, of the one activated partial transmission of the dual clutch transmission is engaged or shifted.

The feature that the other partial transmission is deactivated or passive is to be understood to mean that a transmission of the torque provided by the other drive motor via the other passive or deactivated partial transmission to the output shaft does not occur, so that no torque flow takes place from the drive motor via the other passive partial transmission to the output shaft. Expressed in still other words, for example, a second transmission path is provided, via which the torque provided by the drive motor can be transmitted from the drive motor to the output shaft. The one partial transmission is arranged in the first transmission path. The other partial transmission is arranged in the second transmission path. If the one partial transmission is active or activated, the first transmission path is closed, so that the torque provided by the drive motor is transmitted from the drive motor via the one activated partial transmission to the output shaft. Since the other partial transmission is passive or deactivated, the second transmission path is open, so that the torque provided by the drive motor is not transmitted via the other partial transmission to the output shaft.

Therefore, while the first transmission path is closed, the second transmission path is open. If the first transmission were open and the second transmission path were closed, for example, the torque provided by the drive motor would thus be transmitted from the drive motor via the other partial transmission and not via the one partial transmission to the output shaft, so that then a torque flow would take place from the drive motor via the other partial transmission to the output shaft. With respect to this torque flow, the other partial transmission would then be arranged downstream of the drive motor and upstream of the output shaft. When noises are being suppressed or during the method according to the invention, however, the one partial transmission is activated and the other partial transmission is deactivated.

In particular, it can be provided that a first clutch is associated with the first partial transmission and a second clutch of the dual clutch transmission is associated with the second partial transmission. In this case, the drive motor has a driven shaft, for example, which can be designed as a crankshaft. The one partial transmission is activated, for example, while the other partial transmission is deactivated, in that the first clutch is closed while the second clutch is open. The torque provided by the drive motor, in particular via the driven shaft, can thus be transmitted from the driven shaft via the first clutch to the one partial transmission and introduced into the one partial transmission or the torque provided by the drive motor, in particular the driven shaft, is transmitted from the driven shaft via the closed first clutch to the one partial transmission and introduced into the one partial transmission, in particular while a transmission of the torque from the driven shaft via the second clutch to the other partial transmission does not occur, since the second clutch is open. For example, to deactivate the one partial transmission and activate the other partial transmission, the first clutch is opened and the second clutch is closed.

The dual clutch transmission is switchable, for example between a coupling state and a decoupling state. In the decoupling state, the idler which is associated with the other synchronizer of the one partial transmission is decoupled from the shaft of the one partial transmission, so that the idler which is associated with the other synchronizer of the one partial transmission is rotatable in relation to the shaft of the one partial transmission, or so that the idler which is associated with the other synchronizer of the one partial transmission rotates in relation to the shaft of the one partial transmission. In the coupling state, however, the idler which is associated with the other synchronizer of the one partial transmission is connected in a rotationally-fixed manner to the shaft of the one partial transmission. In this way, for example, the torque provided by the drive motor, in particular via the driven shaft, which is transmitted, for example from the driven shaft via the first clutch to the one partial transmission and is thus introduced into the one partial transmission, is transmitted via the idler which is associated with the other synchronizer of the one partial transmission to the output shaft, or the torque is transmitted from the idler which is associated with the other synchronizer of the one partial transmission to the shaft or vice versa. Expressed in still other words, the idler which is associated with the other synchronizer of the one partial transmission is then in the torque flow or in the closed first transmission path.

The feature that the one synchronizer of the one partial transmission is activated or deliberately actuated is to be understood in particular to mean that the one synchronizer, in particular at least one actuator of the one synchronizer, is deliberately or actively activated, in particular by an electronic processing unit. The electronic processing unit is also referred to as a control unit. For example, the above-mentioned friction partners of the one synchronizer are brought into mutual contact, i.e. into mutual friction contact, by the activation of the first synchronizer, in particular the actuator, whereby friction occurs between the friction partners. The friction partners interact to transmit torque due to this friction, whereby the dual clutch transmission or oscillations of the dual clutch transmission can be actively damped. If the one synchronizer is unactuated, for example, the friction partners are thus spaced apart from one another, so that the friction partners are not in mutual contact and therefore no friction occurs between them. This means that by targeted or active actuation of the one synchronizer, active damping can be effectuated in the dual clutch transmission, also referred to as a transmission, whereby particularly advantageous acoustic behavior can be represented.

The invention is based in particular on the following findings: Drivetrains in vehicles typically comprise shift transmissions, for example dual clutch transmissions, clutches, and axle drives. Due to their design, such drivetrains have points or regions which are subject to friction. The level or the extent of the friction, which can be measured as a drag torque, for example, can be positive as damping, since this damping can counteract free oscillation of different components, for example idlers. Positive acoustic behavior can be achieved in the vehicle in this way. On the other hand, however, this friction is negative with respect to losses in the drivetrain. This is because overcoming this friction requires additional drive energy. Current developments with increased focus on consumption-optimized drivetrains have therefore resulted in an intensified goal conflict with regard to bad acoustics in the vehicle.

The method according to the invention enables the above-mentioned goal conflict to be remedied and thus friction-reducing and therefore consumption-reducing or consumption-optimizing measures to be implemented on or in the dual clutch transmission, so that a particularly high efficiency of the dual clutch transmission can be implemented. Furthermore, advantageous noise behavior can be implemented in spite of the friction-reducing measures, since due to the deliberate or active actuation of the one synchronizer, needs-based friction between the friction partners or needs-based and active damping can be implemented. The actuation of the one synchronizer is in particular to be monitored or limited with respect to its shift travel, in order to prevent simultaneously engaging two gears of the one partial transmission reliably. This is possible, for example, by limiting the shift travel of the one synchronizer, which can be monitored, for example by a shift travel measurement. The shift travel is to be understood, for example, as a travel by which the one synchronizer, in particular at least one synchronizer element of the one synchronizer, can be moved in the axial direction of the idler which is associated with the one synchronizer, in particular in relation to the idler which is associated with the one synchronizer. The maximum shift travel can be executed, for example up to a pre-synchronization.

The deliberate or active actuation of the one synchronizer enables situational damping of oscillations. This means that, for example during operation or during an operating time of the dual clutch transmission, the one synchronizer is only actuated temporarily or briefly, in particular during respective time periods, and otherwise remains unactuated during the operation or during the operating time, so that particularly efficient and thus low fuel-consumption operation can be implemented. This means that the actuation of the one synchronizer preferably exclusively takes place in time periods with acoustic anomaly and preferably otherwise does not occur.

In addition, in the method according to the invention, the one synchronizer provided in any case is used to damp oscillations. Conceptual further expenses, i.e. additional components provided for damping, can thus be avoided, so that the number of parts, the weight, the space requirement, and the costs of the dual clutch transmission can be kept particularly low. In other words, the method according to the invention is implementable by already existing components and is achievable particularly cost-effectively.

Since the one synchronizer of the one activated partial transmission is activated while the idler which is associated with the other synchronizer of the one partial transmission is connected in a rotationally-fixed manner to the shaft of the one partial transmission, i.e. while a gear of the one activated partial transmission is engaged, two gears of the one activated partial transmission are actuated simultaneously, preferably without connecting the idler which is associated with the one synchronizer in a rotationally-fixed manner to the shaft of the one partial transmission. An internal tension is thus deliberately implemented in this way, whereby oscillations can be damped and therefore undesired noises can be avoided.

In one particularly advantageous embodiment of the invention, the one synchronizer of the one partial transmission is actuated in such a way that a rotationally-fixed connection of the idler, which is associated with the one synchronizer, of the one partial transmission to the shaft of the one partial transmission does not take place. Simultaneously engaging or shifting two gears of the one partial transmission can thus be reliably avoided, so that excessive loads and damage to the dual clutch transmission and accompanying noises can be avoided.

To implement particularly advantageous noise behavior, it is provided in a further embodiment of the invention that the actuation of the one synchronizer is maintained during a time span, in particular continuously or without interruption, in particular while a rotationally-fixed connection of the idler, which is associated with the other synchronizer, of the one partial transmission to the shaft of the one partial transmission does not take place. The feature that the actuation is maintained continuously or without interruption during the time span is to be understood to mean that during the time span, canceling or ending the actuation of the one synchronizer does not occur. Oscillations can thus be damped particularly effectively and efficiently.

To be able to avoid undesired noises particularly well in this case, it is provided in a further embodiment of the invention that the time span is longer than one second, in particular longer than five seconds, and preferably longer than ten seconds.

To be able to ensure particularly advantageous noise behavior and particularly efficient operation, it is provided in a further embodiment of the invention that the actuation of the one synchronizer is ended after the time span, which is also referred to as the first time span, so that a second time span follows the first time span, during which the one synchronizer is unactuated, the one partial transmission is activated, the other partial transmission is deactivated, and the idler which is associated with the other synchronizer of the one partial transmission is connected in a rotationally-fixed manner to the shaft of the one partial transmission.

It has proven to be particularly advantageous here if the second time span is at least twice as long, in particular at least three times as long as the first time span. Particularly efficiency-favorable operation can thus be ensured.

In one particularly advantageous embodiment of the invention, the first time span is preceded by a further time span, which is also referred to as the third time span. This means that the further time span is before the first time span with respect to time. During the further time span, the one synchronizer is unactuated, the one partial transmission is activated, the other partial transmission is deactivated, and the idler which is associated with the other synchronizer of the one partial transmission is connected in a rotationally-fixed manner to the shaft of the one partial transmission. The energy consumption and thus the fuel consumption can thus be kept particularly low.

To implement particularly high efficiency, it is provided in a further embodiment of the invention that the further time span is at least twice as long, in particular at least three times as long as the first time span.

Finally, it has proven to be particularly advantageous if the actuation or the actuating of the one synchronizer comprises that the one synchronizer, in particular at least the above-mentioned actuator, is activated so that the at least two friction partners of the one synchronizer are brought, in particular moved, into mutual friction contact.

A second aspect of the invention relates to a dual clutch transmission for a motor vehicle, in particular for an automobile, for example a passenger vehicle. The dual clutch transmission has at least one electronic processing unit, which is also referred to as a control unit. In particular, for example, the method according to the invention according to the first aspect of the invention is carried out by means of the control unit. The dual clutch transmission according to the second aspect of the invention furthermore comprises at least or precisely two partial transmissions, which each have at least one shaft, at least two synchronizers, and at least two idlers arranged on the respective shaft and associated with the respective synchronizers. In this case, the respective idler is to be synchronized by means of the respective associated synchronizer with the respective shaft of the respective partial transmission.

To be able to implement particularly advantageous noise behavior in a particularly simple and cost-effective manner, it is provided according to the invention that the electronic processing unit is designed to actuate, in particular in an activated or deliberate manner, one of the synchronizers of one of the partial transmissions, while the one partial transmission is activated, the other partial transmission is deactivated, and the idler which is associated with the other synchronizer of the other partial transmission is connected in a rotationally-fixed manner to the shaft of the one partial transmission. Advantages and advantageous embodiments of the first aspect of the invention are to be considered advantages and advantageous embodiments of the second aspect of the invention and vice versa.

The invention also comprises the combinations of the features of the described embodiment.

The invention also includes refinements of the dual clutch transmission according to the invention which have features as have already been described in conjunction with the refinements of the method according to the invention. For this reason, the corresponding refinements of the dual clutch transmission according to the invention are not described once again here.

Further advantages, features, and details of the invention result from the following description of a preferred exemplary embodiment and with reference to the drawings. The features and feature combinations mentioned above in the description and the features and feature combinations mentioned hereinafter in the description of the figures and/or solely shown in the figures are usable not only in the particular specified combination but rather also in combinations or alone, without leaving the scope of the invention.

BRIEF DESCRIPTION OF THE FIGURES

In the figures.

DETAILED DESCRIPTION

The exemplary embodiment explained hereinafter is a preferred embodiment of the invention. In the exemplary embodiment, the described components of the embodiments each represent individual features of the invention to be considered independently of one another, which each also refine the invention independently of one another. The disclosure is therefore also to comprise combinations of the features of the embodiment other than those illustrated. Furthermore, the described embodiment can also be supplemented by further ones of the above-described features of the invention.

In the figures, identical reference signs each refer to functionally-identical elements.

Figure 1:
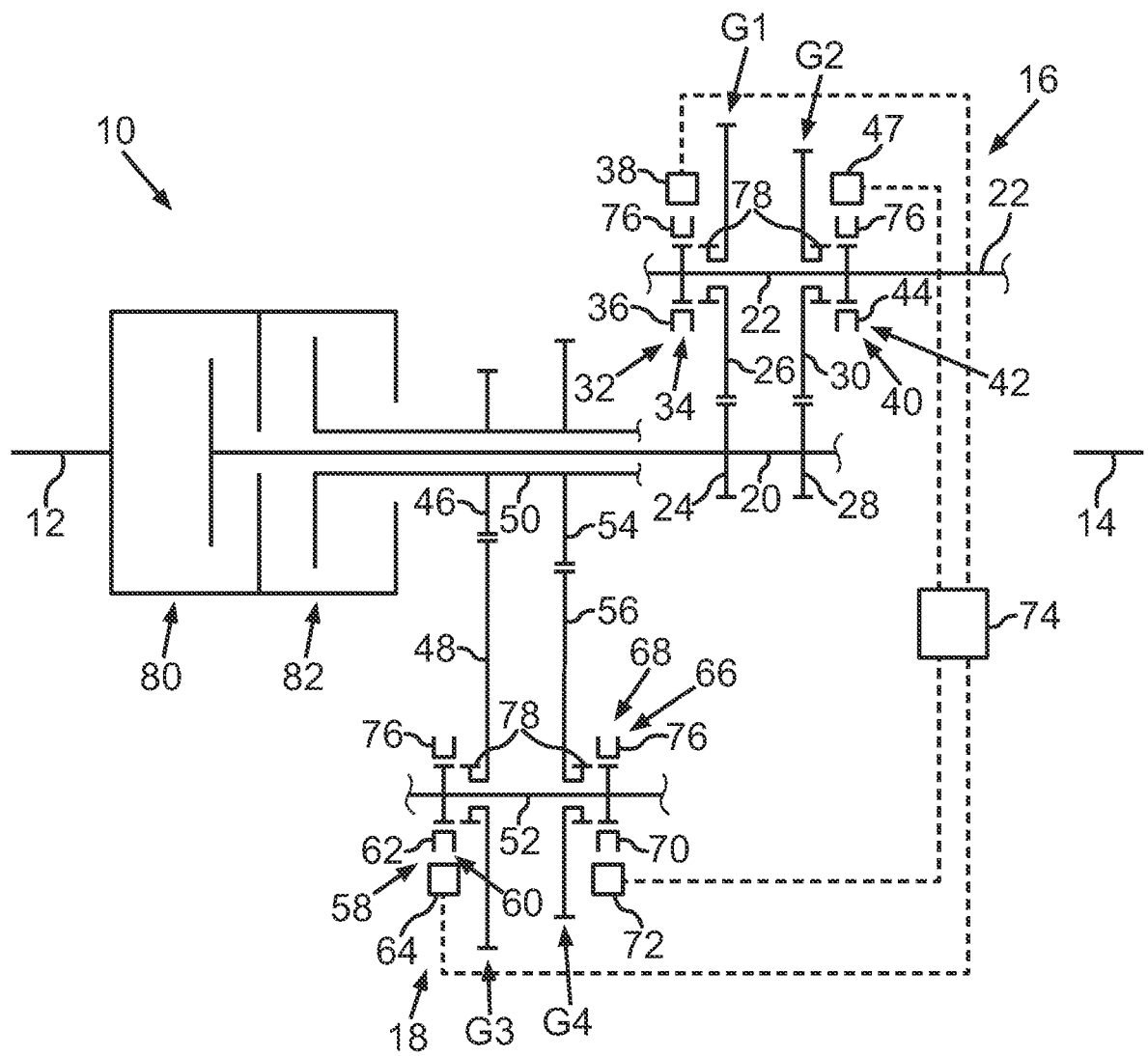
FIG. 1 partially shows a schematic illustration of a dual clutch transmission according to the invention for a motor vehicle.

FIG. 1 partially shows a schematic illustration of a dual clutch transmission 10 for a motor vehicle, in particular for an automobile, for example a passenger vehicle. In its completely produced state, the motor vehicle comprises a drive motor (not shown in the figures), which is designed, for example as an electric motor or as an internal combustion engine, in particular as a reciprocating piston engine. The drive motor has a driven shaft 12 partially recognizable in FIG. 1, which is designed, for example, as a crankshaft. The drive motor can provide at least one torque for driving the motor vehicle via the driven shaft 12. The motor vehicle additionally comprises an output shaft 14 partially recognizable in FIG. 1, onto which the torque provided by the drive motor via the driven shaft 12 can be transmitted via the dual clutch transmission 10. The feature that the drive motor provides or can provide the torque via the driven shaft 12 is to be understood to mean that the driven shaft 12 can provide or provides the torque.

The dual clutch transmission 10 has a first partial transmission 16 and a second partial transmission 18. The first partial transmission 16 has a first shaft 20, which is, for example an input shaft of the first partial transmission 16. Furthermore, the first partial transmission 16 has a second shaft 22, which is, for example an output shaft of the partial transmission 16. Overall, the dual clutch transmission 10 has, for example, seven forward gears for effectuating forward travel of the motor vehicle and at least or precisely one reverse gear for effectuating reverse travel. The forward gears and the reverse gears are gears, so that the dual clutch transmission 10 has a total of at least or precisely eight gears. In this case, the partial transmission 16 has four first ones of the gears, while the partial transmission 18 has four second ones of the gears. In other words, the respective partial transmission 16 or 18 forms four of the eight gears of the dual clutch transmission 10. A first of the gears is identified with G1 in FIG. 1, wherein a second of the gears is identified with G2 in FIG. 1. The gears G1 and G2 are formed by the partial transmission 16. It is apparent from FIG. 1 that the gear G1 and thus the partial transmission 16 has gearwheels 24 and 26, which mesh with one another or are engaged with one another via respective gear teeth. The gearwheels 24 and 26 are also referred to as wheels. The gearwheel 24 is a fixed wheel, which is permanently connected in a rotationally-fixed manner to the shaft 20. In contrast, however, the gearwheel 26 is an idler, which is rotatably arranged on the shaft 22 and therefore, in particular when the gearwheel 26 is not connected in a rotationally-fixed manner to the shaft 22, can be rotated in relation to the shaft 22 or rotates in relation to the shaft 22.

The gear G2 and thus the partial transmission 16 has gearwheels 28 and 30, which mesh with one another via respective gear teeth. The gearwheel 28 is a fixed wheel, since it is permanently connected in a rotationally-fixed manner to the shaft 20. However, the gearwheel 30 is an idler, since it is rotatably arranged on the shaft 22. The gearwheels 28 and 30 are wheels of the gear G2.

A shifting device 32 is associated with the gearwheel 26, by means of which the gearwheel 26 can be connected in a rotationally-fixed manner to the shaft 22. The shifting device 32 comprises a synchronizer 34, by means of which the gearwheel 26 can be synchronized with the shaft 22. The synchronizer 34 and thus the shifting device 32 comprises, for example, a shifting collar 36, also referred to as a sliding collar, which can be displaced in the axial direction of the shaft 22 and thus of the gearwheel 26 in relation to the gearwheel 26 and in relation to the shaft 22 between at least one coupling position and at least one decoupling position. For this purpose, the synchronizer 34 and thus the shifting device 32 comprise an actuator 38, by means of which the shifting collar 36 can be displaced.

Correspondingly, a shifting device 40 is provided in the gearwheel 30, by means of which the gearwheel 30 can be connected in a rotationally-fixed manner to the shaft 22. The shifting device 40 comprises a synchronizer 42, by means of which the gearwheel 30 can be synchronized with the shaft 22. The synchronizer 42 and thus the shifting device 40 comprise a shifting collar 44, also referred to as a sliding collar, which can be displaced in the axial direction of the shaft 22 and thus of the gearwheel 30 in relation to the shaft 22 and in relation to the gearwheel 30 between at least one coupling position and at least one decoupling position. For this purpose, the synchronizer 42 and the shifting device 40 comprise an actuator 47, by means of which the shifting collar 44, also referred to as a sliding collar, can be displaced. In the respective decoupling position, the respective gearwheel 26 or 30 is decoupled from the shaft 22, so that the gearwheel 26 or 30 can rotate in relation to the shaft 22 or so that torque cannot be transmitted between the gearwheel 26 or 30 and the shaft 22. However, in the respective coupling position, the respective gearwheel 26 or 30 is connected in a rotationally-fixed manner, in particular in a formfitting manner, to the shaft 22, in particular via the respective synchronizer 34 or 42, so that torques can be transmitted between the shaft 22 and the gearwheel 26 or 30, in particular via the shifting device 32 or 40.

A third of the gears is identified by G3 in FIG. 1, and a fourth of the gears is identified by G3 in FIG. 1. The gears G3 and G4 are components of the partial transmission 18 or are formed by the partial transmission 18. The gear G3 and thus the partial transmission 18 comprise gearwheels 46 and 48, which mesh with one another via respective gear teeth. Moreover, the partial transmission 18 comprises a shaft 50, which is designed, for example as an input shaft of the partial transmission 18. Furthermore, the partial transmission 18 comprises a shaft 52, which is designed, for example as an output shaft of the partial transmission 18. The gearwheel 46 is a fixed wheel, which is permanently connected in a rotationally-fixed manner to the shaft 50. In contrast, the gearwheel 48 is an idler, which is rotatably arranged on the shaft 52. The gearwheels 46 and 48 are wheels of the gear G3.

The gear G4 and thus the partial transmission 18 furthermore comprise gearwheels 54 and 56, which mesh with one another via respective gear teeth and are wheels of the gear G4. The gearwheel 54 is a fixed wheel, which is permanently connected in a rotationally-fixed manner to the shaft 50. In contrast, the gearwheel 56 is an idler, which is arranged, in particular mounted, rotatably on the shaft 52.

A shifting device 58 is associated with the gearwheel 48, by means of which the gearwheel 48 can be connected in a rotationally-fixed manner to the shaft 52. The shifting device 58 comprises a synchronizer 60, by means of which the gearwheel 48 can be synchronized with the shaft 52. The synchronizer 60 and thus the shifting device 58 comprise a shifting collar 62, which can be displaced in the axial direction of the shaft 52 and thus of the gearwheel 48 in relation to the gearwheel 48 and in relation to the shaft 52 between at least one coupling position and at least one decoupling position. For this purpose, the synchronizer 60 and thus the shifting device 58 comprise an actuator 64, by means of which the shifting collar 62 can be displaced.

Accordingly, a shifting device 66 is associated with the gearwheel 56, by means of which the gearwheel 56 can be connected in a rotationally-fixed manner to the shaft 52. For this purpose, the shifting device 66 comprises a synchronizer 68, by means of which the gearwheel 56 can be synchronized with the shaft 52. The synchronizer 68 and thus the shifting device 66 comprise a shifting collar 70, which can be displaced in the axial direction of the shaft 52 and thus of the gearwheel 56 in relation to the shaft 52 and in relation to the gearwheel 56 between at least one coupling position and at least one decoupling position. For this purpose, the synchronizer 68 and the shifting device 66 comprise an actuator 72, by means of which the shifting collar 70 can be displaced. The respective actuator 38, 46, 64, or 72 is, for example, electrically and/or pneumatically and/or hydraulically operable or actuatable.

In the respective decoupling position of the respective shifting collar 62 or 70, the respective gearwheel 48 or 56 is decoupled from the shaft 52, so that torques cannot be transmitted between the respective gearwheel 48 or 56 and the shaft 52. In the respective coupling position of the shifting collar 62 or 70, however, the gearwheel 48 or 56 is connected in a rotationally-fixed manner via the shifting collar 62 or 70, in particular connected in a formfitting, rotationally-fixed manner, to the shaft 52, so that torques can be transmitted between the gearwheel 48 or 56 and the shaft 52, in particular via the respective synchronizer 60 or 68.

It is apparent from FIG. 1 that the gearwheel 26 is associated with the synchronizer 34 or vice versa. The gearwheel 30 is associated with the synchronizer 42 or vice versa. The gearwheel 48 is associated with the synchronizer 60 or vice versa, and the gearwheel 56 is associated with the synchronizer 68 or vice versa.

The dual clutch transmission 10 additionally also comprises an electronic processing unit 74, referred to as a control unit, which is coupled for signaling to the actuators 38, 46, 64, and 72, for example. The processing unit 74 can thus activate the actuators 38, 46, 64, and 72. By way of such an activation of the respective actuator 38, 46, 64, or 72, the electronic processing unit 74 can effectuate a displacement of the respective shifting collar 36, 44, 62, or 70 via the respective actuator 38, 46, 64, and 72. In particular, the electronic processing unit 74 can actuate the respective synchronizer 34, 42, 60, or 68 by activating the actuator 38, 46, 64, or 72. A or the actuation of the respective synchronizer 34, 42, 60, or 68 is to be understood to mean that at least two friction partners 76 and 78 of the respective synchronizer 34, 42, 60, or 68 are brought, in particular moved, into mutual contact, in particular into mutual friction contact. The friction partner 76 is co-rotatable here, for example with the respective shaft 22 or 52, wherein the respective friction partner 76 is preferably connected in a rotationally-fixed manner to the shaft 22 or 52. For example, the friction partner 76 is formed by the respective shifting collar 36, 44, 62, or 70 or is at least co-rotatable with the respective shifting collar 36, 44, 62, or 70.

The friction partner 78 is, for example co-rotatable with the respective idler. In particular, the respective friction partner 78 can be connected in a rotationally-fixed manner to the respective idler. The respective idler is at least or exclusively coupled frictionally, i.e. by friction with the shaft 22 or 52, due to the friction contact between the friction partners 76 and 78, wherein the friction contact is effectuated or set by actuating the respective synchronizer 34, 42, 60, or 68. In the context of an engagement of the initially designed respective gear G1, G2, G3, or G4, due to the friction contact of a friction resulting therefrom between the friction partners 76 and 78, the respective idler can be synchronized with the respective shaft 22 or 52.

As is moreover apparent from FIG. 1, a first clutch 80 of the dual clutch transmission 10 is associated with the partial transmission 16, and a second clutch 82 of the dual clutch transmission 10 is associated with the partial transmission 18. The respective clutch 80 or 82 can be opened and closed. It is preferably provided that the clutch 82 is open while the clutch 80 is closed. While the clutch 82 is closed, the clutch 80 is preferably open. If the clutch 80 is closed while the clutch 82 is open, the partial transmission 16 is thus activated or active, while the partial transmission 18 is deactivated or passive. If the clutch 82 is closed while the clutch 80 is open, the partial transmission 18 is thus activated or active while the partial transmission 16 is deactivated or passive.

To now avoid undesired noises and thus be able to implement particularly advantageous noise behavior of the dual clutch transmission 10, in particular during its operation, in a particularly simple and cost-effective manner, a method for suppressing noises in the dual clutch transmission 10 is carried out. For example, to suppress noises in the dual clutch transmission 10, the synchronizer 42 of the partial transmission 16 is actuated while the partial transmission 16 is active, the partial transmission 18 is deactivated, and the gearwheel 26 is connected in a rotationally-fixed manner to the shaft 22.

The respective synchronizer 34, 42, 60, or 68 is designed, for example, as a friction cone synchronizer, via which the respective gear G1, G2, G3, or G4, also referred to as a gear step, is shiftable, i.e. can be shifted.

Since the gearwheel 26 is connected in a rotationally-fixed manner to the shaft 22 via the synchronizer 34 and thus via the shifting device 32, in the present case the gear G1 is a currently shifted or engaged travel gear, wherein, for example, all other shifting elements of the partial transmission 16 are in their neutral position or are not actuated, so that, for example, all other idlers of the partial transmission 16 are not connected in a rotationally-fixed manner to the shaft 22 or so that all other gears of the partial transmission 16 are disengaged or deactivated.

In the passive partial transmission 18, either no gear is shifted or, in particular precisely, one of the gears of the partial transmission 18 is preselected. In the exemplary embodiment illustrated in FIG. 1, the shifting collar 62 is in its decoupling position while the shifting collar 70 is in its coupling position. The gearwheel 56 is thus connected in a rotationally-fixed manner to the shaft 52, so that the gear G4 is preselected. However, the clutch 82 is open, so that the partial transmission 18 is deactivated. All other shifting elements are in their neutral position or are not shifted, for example, so that, for example, all other gears are disengaged or all other idlers of the partial transmission 18 are not connected in a rotationally-fixed manner to the shaft 52.

In particular, the synchronizer 42 is actuated in such a way that a rotationally-fixed connection of the gearwheel 30 to the shaft 22 does not occur. A, in particular exclusive, frictional coupling of the gearwheel 30 to the shaft 22 does occur due to the actuation of the synchronizer 42, however a relative rotation is permitted between the shaft 22 and the gearwheel 30, so that a rotationally-fixed coupling of the gearwheel 30 to the shaft 22 does not occur. A torque definable with respect to time and in its level can be generated by the actuation of the synchronizer 42, which is transmitted, for example, via the described friction contact between the friction partners 76 and 78 of the synchronizer 42 between the shaft 22 and the gearwheel 30. Undesired free oscillation of at least one or more regions of the dual clutch transmission 10 can thus be avoided, for example. The dual clutch transmission 10 can thus be designed with particularly low friction. At the same time, advantageous noise behavior can be implemented, since a noise-generating free oscillation or noise-generating oscillations can be actively suppressed by the active actuation of the synchronizer 42. In particular, optimized bearings and/or seals and/or an optimized clutch drag torque can be used in order to keep the internal friction of the dual clutch transmission 10 particularly low.

Figure 2:
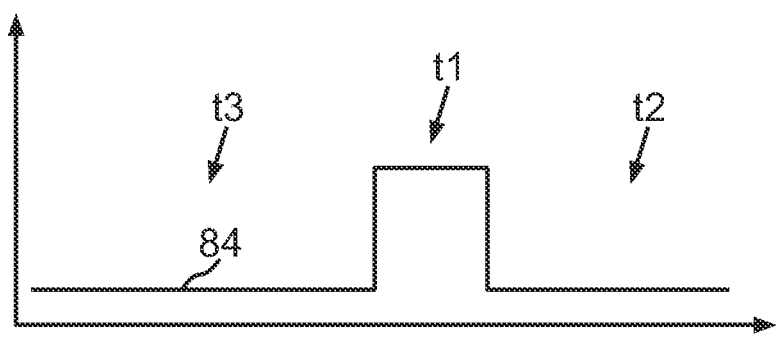
FIG. 2 shows a diagram to illustrate the method according to the invention for operating the dual clutch transmission and in particular for suppressing noises in the dual clutch transmission.

FIG. 2 shows a diagram to illustrate the method. A curve 84 plotted in the diagram illustrates the actuation of the synchronizer 42. It is apparent from FIG. 2 that the actuation of the synchronizer 42 is maintained during a first time span t1. After the time span t1, the actuation of the synchronizer 42 is ended, so that a second time span t2 follows the first time span t1. During the time span t2, the synchronizer 42 is unactuated, the partial transmission 16 is activated, the partial transmission 18 is deactivated, the gearwheel 26 is connected in a rotationally-fixed manner to the shaft 22, and the gearwheel 30 is decoupled from the shaft 22 or all idlers of the partial transmission 16 with the exception of the gearwheel 26 are decoupled from the shaft 22, so that they are not connected in a rotationally-fixed manner to the shaft 22.

Furthermore, it is apparent from FIG. 2 that the first time span t1 is preceded by a further, third time span t3, during which the synchronizer 42 is unactuated, the partial transmission 16 is activated, the partial transmission 18 is deactivated, and the gearwheel 26 is connected in a rotationally-fixed manner to the shaft 22 and the gearwheel 30 is decoupled from the shaft 22. The actuation of the synchronizer 42 thus only takes place temporarily and otherwise does not occur, whereby a particularly efficiency-favorable and thus energy-efficient operation can be ensured.

The invention claimed is:

1. A method for suppressing noises in a dual clutch transmission, which has two partial transmissions and each partial transmission has at least two synchronizers, for a motor vehicle, wherein a respective shaft of the respective partial transmission is to be synchronized by the respective synchronizer, each synchronizer associated with a respective idler, which is arranged on the respective shaft and is associated with the respective synchronizer of the respective partial transmission, wherein to suppress noises, one of the synchronizers of one of the partial transmissions is actuated, while the one partial transmission is activated, the other partial transmission is deactivated, and the idler which is associated with the other synchronizer of the one partial transmission is connected in a rotationally-fixed manner to the shaft of the one partial transmission, and wherein the actuation of the one synchronizer is maintained during a time span and a second time span, during which the one synchronizer is unactuated, the one partial transmission is activated, the other partial transmission is deactivated, and the idler which is associated with the other synchronizer of the one partial transmission is connected in a rotationally-fixed manner to the shaft of the one partial transmission.

2. The method as claimed in claim 1, wherein the one synchronizer of the one partial transmission is actuated in such a way that a rotationally-fixed connection of the idler, which is associated with the one synchronizer, of the one partial transmission with the shaft of the one partial transmission does not occur.

3. The method as claimed in claim 1, wherein the time span is longer than ten seconds.

4. The method as recited in claim 1, wherein the second time span is at least three times as long as the first time span.

5. The method as claimed in claim 1, wherein the time span is preceded by a further time span, during which the one synchronizer is unactuated, the one partial transmission is activated, the other partial transmission is deactivated, and the idler which is associated with the other synchronizer of the one partial transmission is connected in a rotationally-fixed manner to the shaft of the one partial transmission.

6. The method as claimed in claim 5, wherein the further time span is at least three times as long as the first time span.

7. The method as claimed in claim 1, wherein the actuation of the one synchronizer comprises that at least one actuator of the one synchronizer, is activated, so that at least two friction partners of the one synchronizer are brought into mutual friction contact.

8. The method as claimed in claim 3, wherein the time span is preceded by a further time span, during which the one synchronizer is unactuated, the one partial transmission is activated, the other partial transmission is deactivated, and the idler which is associated with the other synchronizer of the one partial transmission is connected in a rotationally-fixed manner to the shaft of the one partial transmission.

9. The method as claimed in claim 4, wherein the time span is preceded by a further time span, during which the one synchronizer is unactuated, the one partial transmission is activated, the other partial transmission is deactivated, and the idler which is associated with the other synchronizer of the one partial transmission is connected in a rotationally-fixed manner to the shaft of the one partial transmission.

10. The method as claimed in claim 2, wherein the actuation of the one synchronizer comprises that at least one actuator of the one synchronizer, is activated, so that at least two friction partners of the one synchronizer are brought into mutual friction contact.

11. The method as claimed in claim 3, wherein the actuation of the one synchronizer comprises that at least one actuator of the one synchronizer, is activated, so that at least two friction partners of the one synchronizer are brought into mutual friction contact.

12. The method as claimed in claim 4, wherein the actuation of the one synchronizer comprises that at least one actuator of the one synchronizer, is activated, so that at least two friction partners of the one synchronizer are brought into mutual friction contact.

13. A dual clutch transmission for a motor vehicle, having at least one electronic processing unit, and having two partial transmissions, which each have a shaft, at least two synchronizers, and at least two idlers, which are arranged on the respective shaft and are associated with the respective synchronizers, wherein the respective idler is to be synchronized by the respective associated synchronizer with the respective shaft of the respective partial transmission, wherein the electronic processing unit is designed, in order to suppress noises, to actuate one of the synchronizers of one of the partial transmissions, while the one partial transmission is activated, the other partial transmission is deactivated, and the idler which is associated with the other synchronizer of the one partial transmission is connected in a rotationally-fixed manner to the shaft of the one partial transmission, and wherein the actuation of the one synchronizer is maintained during a time span and the time span is preceded by a second time span, during which the one synchronizer is unactuated, the one partial transmission is activated, the other partial transmission is deactivated, and the idler which is associated with the other synchronizer of the one partial transmission is connected in a rotationally-fixed manner to the shaft of the one partial transmission.

* * * * *